United States Patent
Markley et al.

(10) Patent No.: US 6,849,015 B2
(45) Date of Patent: Feb. 1, 2005

(54) RATCHETING PIVOT ARM TENSIONER WITH BACKLASH

(75) Inventors: George L. Markley, Montour Falls, NY (US); Joseph W. Hungerford, Newfield, NY (US)

(73) Assignee: Borgwarner Inc., Auburn Hills, MI (US)

( * ) Notice: Subject to any disclaimer, the term of this patent is extended or adjusted under 35 U.S.C. 154(b) by 111 days.

(21) Appl. No.: 10/355,847

(22) Filed: Jan. 31, 2003

(65) Prior Publication Data

US 2004/0152548 A1 Aug. 5, 2004

(51) Int. Cl.⁷ .............................. F16H 7/18; F16H 7/08
(52) U.S. Cl. ..................... 474/111; 474/140; 474/109; 474/117
(58) Field of Search .................. 474/101, 109, 474/111, 112, 117, 133, 140

(56) References Cited

U.S. PATENT DOCUMENTS

| | | | | |
|---|---|---|---|---|
| 3,804,368 A | * | 4/1974 | Bailey | 24/68 CD |
| 4,822,320 A | | 4/1989 | Suzuki | 474/111 |
| 4,822,322 A | | 4/1989 | Martin | 474/135 |
| 5,073,150 A | | 12/1991 | Shimaya | 474/110 |
| 6,193,622 B1 | * | 2/2001 | Cressman et al. | 474/109 |
| 6,234,928 B1 | | 5/2001 | Suzuki et al. | 474/109 |
| 6,244,981 B1 | | 6/2001 | Simpson | 474/110 |
| 6,260,532 B1 | | 7/2001 | Mendler | 123/192.2 |
| 6,322,470 B1 | | 11/2001 | Markley et al. | 474/111 |
| 6,358,169 B1 | | 3/2002 | Markley | 474/111 |
| 2001/0011047 A1 | | 8/2001 | Suzuki | 477/101 |
| 2004/0053719 A1 | * | 3/2004 | Gibson | 474/112 |

FOREIGN PATENT DOCUMENTS

| | | | | |
|---|---|---|---|---|
| DE | 2118208 A | * | 11/1972 | |
| DE | 2550639 A1 | * | 5/1977 | |
| GB | 2195732 A | * | 4/1988 | B21F/9/00 |
| JP | 56-049457 | | 5/1981 | F16H/7/12 |
| JP | 08-226503 | | 9/1996 | F16H/7/08 |

* cited by examiner

Primary Examiner—Marcus Charles
(74) Attorney, Agent, or Firm—Brown & Michaels, PC; Greg Dziegielewski

(57) ABSTRACT

An engine chain or belt tensioning system includes a tensioner pivot arm with a ratcheting means that includes backlash in an engine timing system. The tensioner system includes a tensioner pivot arm having a fixed pin, ratchet teeth, and a connection for a rotation-causing device, all being spaced radially outward from a pivoting feature. The pivoting feature and the fixed pin are positioned between two strands of a chain. An arm carrying a shoe extended outside the strands of chain and positioned to contact an outside portion of chain is pivotally mounted to the fixed pin. Rotation of the pivot arm causes the arm and shoe to draw inwards, imparting tension to the chain strand. The ratchet teeth allow free rotation of the tensioner arm in one direction, but not the other.

5 Claims, 3 Drawing Sheets

PRIOR ART

RATCHETING PIVOT ARM TENSIONER WITH BACKLASH

BACKGROUND OF THE INVENTION

1. Field of the Invention

The present invention relates generally to tensioners used with chain drives in automotive timing and power transmission applications. In particular, the present invention is related to a ratcheting tensioner.

2. Description of Related Art

A tensioning device, such as a hydraulic tensioner, is used as a control device for a power transmission chain, or similar power transmission devices, as the chain travels between a plurality of sprockets. In this device, the chain transmits power from a driving shaft to a driven shaft, so that part of the chain is slack and part of the chain is tight. Generally, it is important to impart and maintain a certain degree of tension in the chain to prevent noise, slippage, or the unmeshing of teeth in the case of a toothed chain. Prevention of such slippage is particularly important in the case of a chain driven camshaft in an internal combustion engine because jumping of teeth will throw off the camshaft timing, possibly causing damage or rendering the engine inoperative.

However, in the harsh environment of an internal combustion engine, various factors can cause fluctuations in the chain tension. For instance, wide variations in temperature and thermal expansion coefficients among the various parts of the engine can cause the chain tension to vary between excessively high or low levels. During prolonged use, wear to the components of the power transmission system can cause a decrease in chain tension. In addition, camshaft and crankshaft induced torsional vibrations cause considerable variations in chain tensions. Reverse rotation of an engine, occurring for example in stopping or in failed attempts at starting, can also cause fluctuations in chain tension. For these reasons, a mechanism is desired to remove excessive tensioning forces on the tight side of the chain and to ensure the necessary tension on the slack side of the chain.

Using hydraulic tensioners is a common method of maintaining proper chain tension. In general, these mechanisms employ a lever arm that pushes against the chain on the slack side of the power transmission system. This lever arm must push toward the chain, tightening the chain when the chain is slack, and must be very rigid when the chain tightens.

To accomplish this result, a hydraulic tensioner typically comprises a rod or cylinder as a piston, which is biased in the direction of the chain by a tensioner spring. The piston is housed within a cylindrical housing, having an interior space which is open at the end facing the chain and closed at the other end. The interior space of the housing contains a pressure chamber in connection with a reservoir or exterior source of hydraulic fluid pressure. The pressure chamber is typically formed between the housing and the piston, and it expands or contracts when the piston moves within the housing.

Blade and block tensioners have been used in the past to apply tension to chains. A block tensioner (1) as known in the prior art is shown in FIG. 1. The tensioner (1) has a piston (2) located within a housing (5). The springs (3) are located in a fluid chamber (4) within the piston (2).

An example of a blade tensioner is shown in FIG. 2. The conventional blade tensioner (10) includes a blade shoe (11) made of resin having a curved chain sliding face and numerous blade springs (21) preferably made of metallic material. The blade springs (21) are arranged in layers on the opposite side of the blade shoe (11) from the chain sliding face, and provide spring force to the blade shoe (11). The ends of each spring-shaped blade spring (21) are inserted in the indented portions (14) and (15) which are formed in the distal portion (12) and proximal portion (13) of the blade shoe (11), respectively.

A bracket (17) is provided for mounting the blade tensioner (10) in an engine. Holes (18) and (19) are formed in the bracket (17), and mounting bolts are inserted into these holes (18) and (19). A sliding face (16) contacts the distal portion of the blade shoe (11) and permits sliding. The slide face (16) is formed on the distal portion of the bracket (17). A pin (20) supports the proximal portion (13) of the blade shoe (11) so that it may move in either direction. The pin (20) is secured in the center of the bracket (17).

U.S. Pat. No. 6,244,981, entitled "Hydraulic Tensioner With Pawl-Style External Rack", issued Jun. 12, 2001, discloses a hydraulic tensioner having an external rack. The tensioner includes a housing having a bore, which receives a hollow piston and an external rack and ratchet assembly. The external rack is formed with pawl-style wedges that fit within the rack formed on the outside of the piston. The rack and ratchet assembly also provides anti backlash.

SUMMARY OF THE INVENTION

The engine chain or belt tensioning system of the present invention includes a tensioner pivot arm with a ratcheting means that includes backlash in an engine timing system. The tensioner system includes a tensioner pivot arm having a fixed pin, ratchet teeth, and a connection for a rotation-causing device, all being spaced radially outward from a pivoting feature. The pivoting feature and the fixed pin are positioned between two strands of a chain. An arm carrying a shoe extended outside the strands of the chain and positioned to contact an outside portion of chain is pivotally mounted to the fixed pin. Rotation of the pivot arm causes the arm and shoe to draw inwards, imparting tension to the chain strand. The ratchet teeth allow free rotation of the tensioner arm in one direction, but not the other.

DETAILED DESCRIPTION OF THE INVENTION

Figure 1:
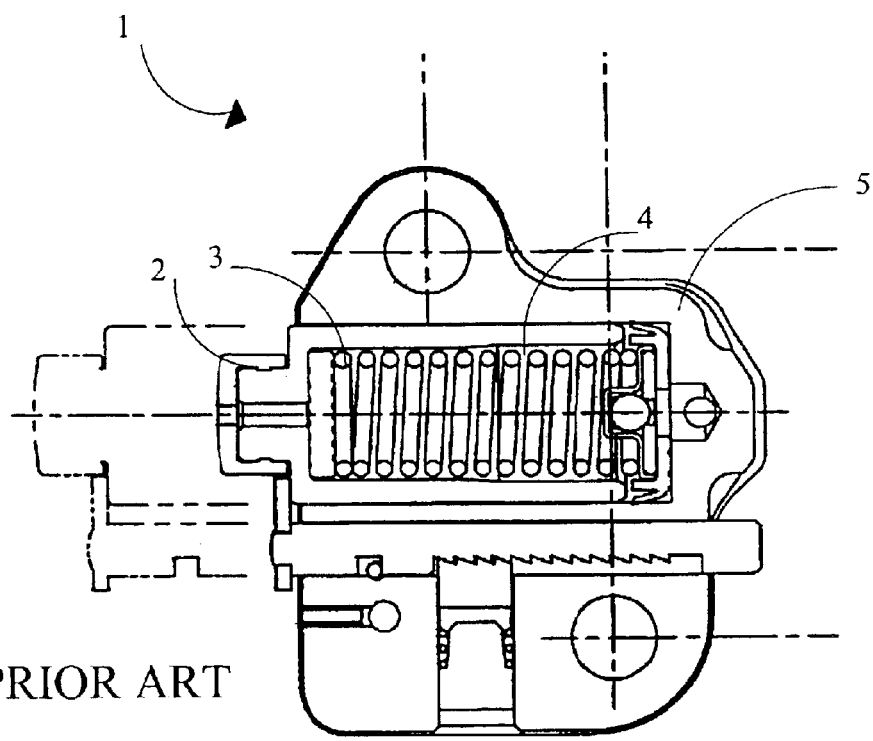
FIG. 1 shows a block tensioner as known in the prior art.
Figure 2:
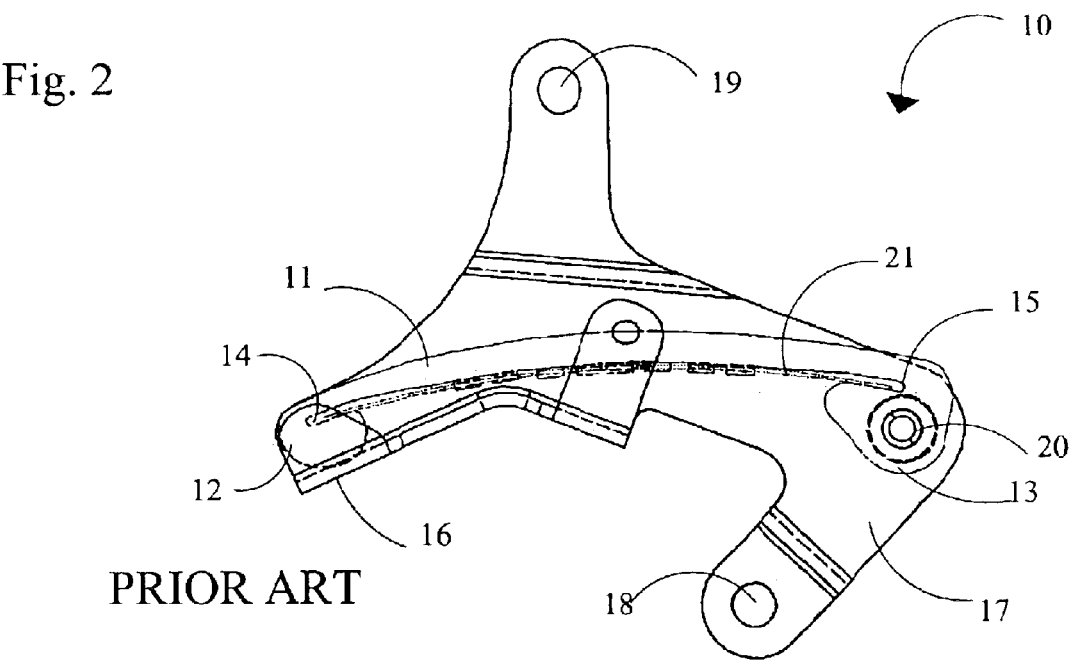
FIG. 2 shows a blade tensioner as known in the prior art.
Figure 3:
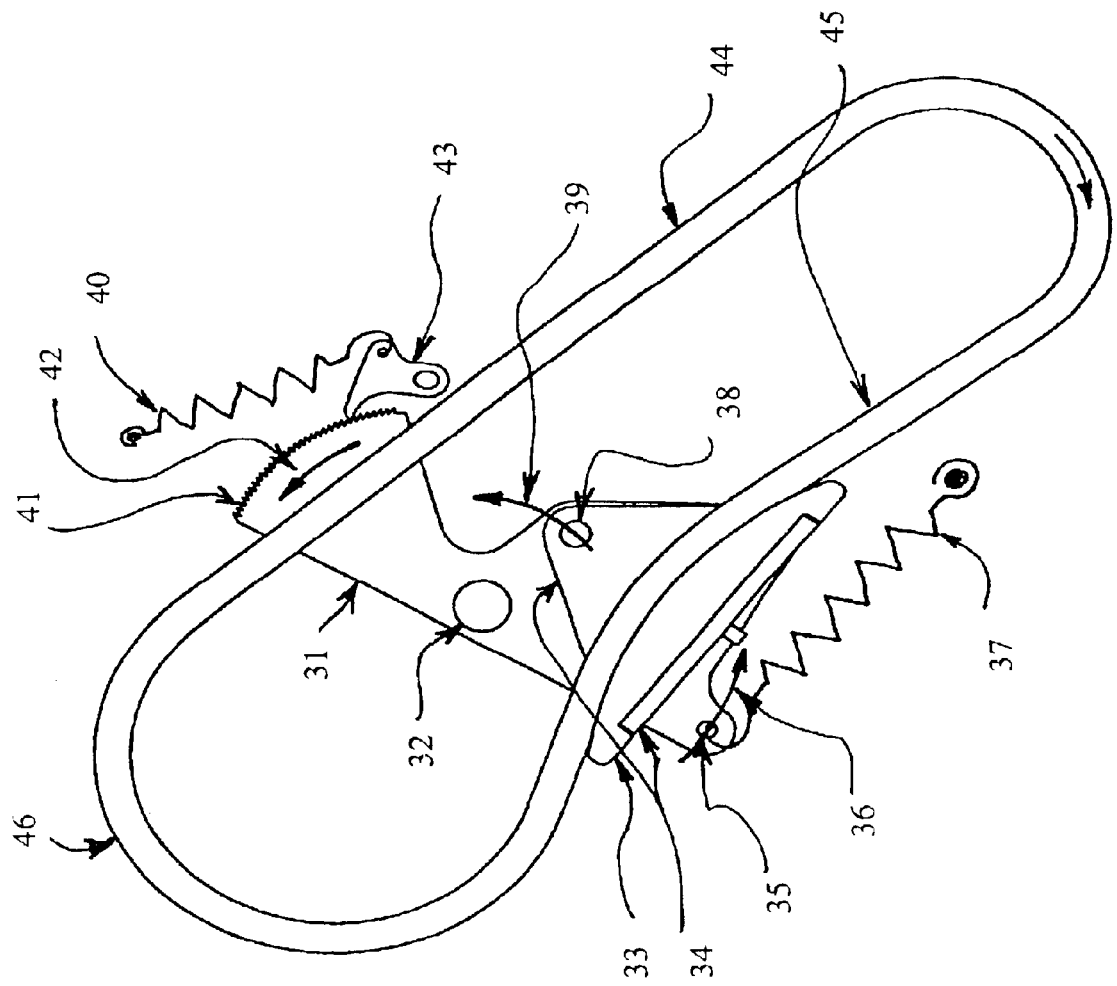
FIG. 3 shows a tensioner of the present invention.
Figure 4:
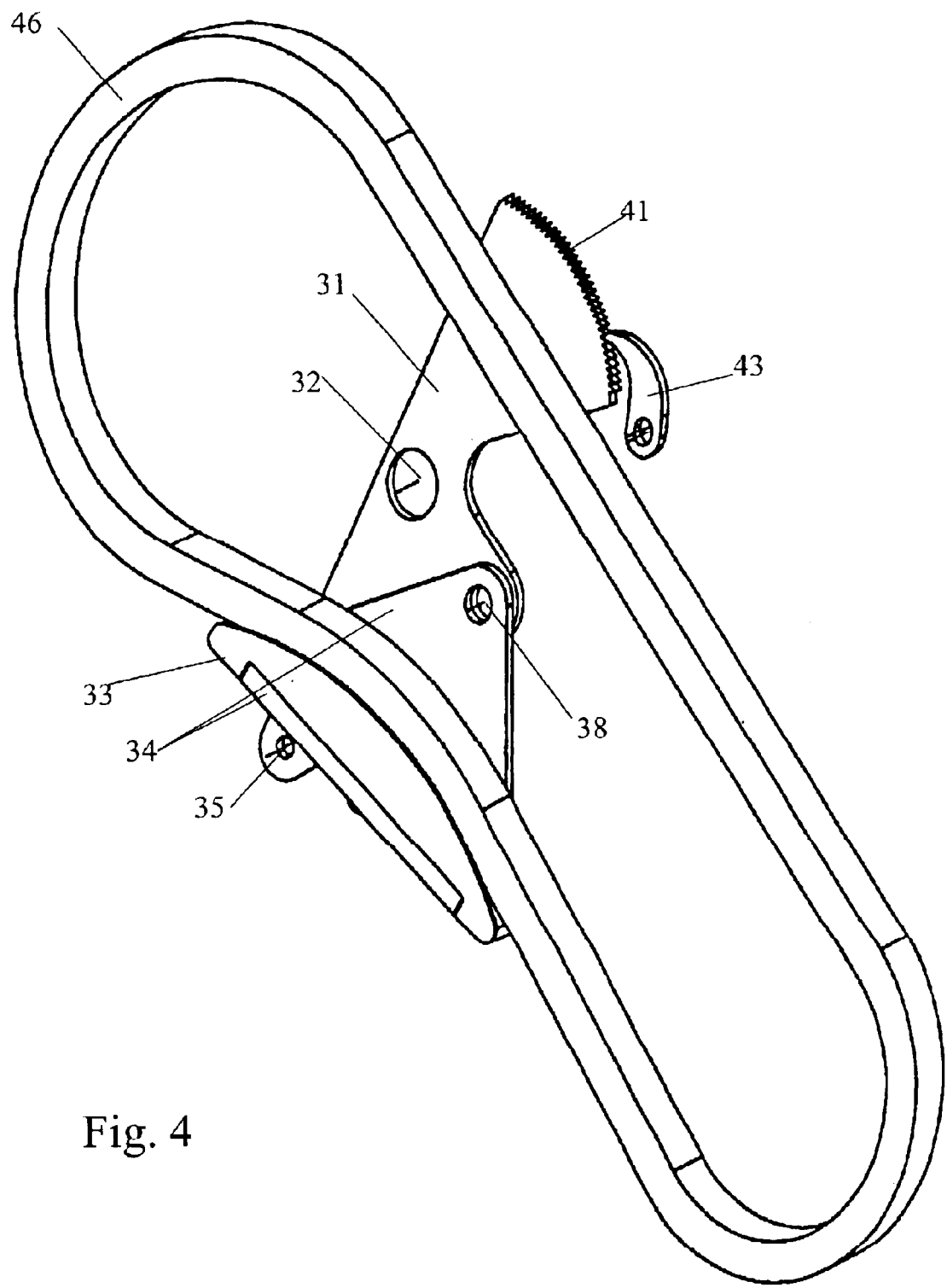
FIG. 4 shows the tensioner of FIG. 3, rotated to illustrate the relationship in the z-directions.

FIG. 3 shows a tensioner of the present invention. The tensioner is positioned to control a tight strand (44) and a slack strand (45) of a timing chain (46). FIG. 4 illustrates the tensioner of FIG. 3, rotated to illustrate the relationship in the z-direction. An arm (34) carries a shoe (33) positioned outside the slack strand (45) of the timing chain (46). The tensioner arm (34) takes up the slack and applies tension to the chain if moved in the direction of arrow (39). The arm (34) and shoe (33) are preferably attached by a fixed pin (38) to a tensioner pivot arm (31). The tensioner pivot arm (31) has a pivot feature at pivot (32). Tensioning occurs when a force is applied at point (35) in the direction of arrow (36). Rotational force in the direction of arrow (36) preferably results from an extension spring (37) attached at point (35).

The type of biasing element used to apply this rotational force preferably includes, but is not limited to, a torsional spring, a compression spring, an extension spring, or a hydraulic piston tensioner.

Excessive reverse rotation of the tensioner pivot arm (31) is preferably limited by adding a ratchet feature, such as ratchet teeth (41), which interface with a pawl (43). Tightening and slackening of the chain is caused by the effect on its environment (for example, the engine block, cylinder head, water, oil, etc.) by temperature changes (for example, a hot engine or a cold engine). To accommodate this tightening and slackening, the assembly requires some amount of backlash. Backlash can be accomplished in many ways without deviating from the spirit of the invention. As an example, the backlash is illustrated as a slotted or oversized hole in the pawl (43) at its pivot pin with a spring force applied to the pawl (43) by extension spring (40) in the direction of arrow (42) and against the ratchet teeth (41). The ratchet teeth (41), pawl interface, and pin size, etc. are determined in accordance with chain loads as affected by the various link arms and/or moment arms and suitable ratchet increments.

When the attachment of the arm (34) and shoe (33) to the tensioner pivot arm (31) at point (38) allows the arm (34) and the shoe (33) to pivot as illustrated, the shoe (33) aligns itself to the chain (46), balancing the loads of its two halves against friction while yielding to chain motion (i.e., chordal fall, chain jerk, chain wave, etc.).

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A tensioning system for power transmission systems comprising:
   a) a pivot arm comprising:
      i) a plurality of ratchet teeth on a first end of the pivot arm; and
      ii) a biasing element attached to a second end of the pivot arm away from the ratchet teeth;
      wherein the pivot arm is pivotally mounted on a pivot inside a loop of a chain, with at least the first end of the pivot arm outside the loop;
   b) a tensioner arm pivotally mounted to the pivot arm, comprising a shoe, extended outside the loop of the chain and positioned to contact an outside portion of the chain;
   c) a pawl pivotally mounted adjacent to the ratchet teeth; and
   d) a pawl spring connected to the pawl, urging the pawl to engage the ratchet teeth;
   wherein rotation of the pivot arm by the biasing element causes the tensioner arm and the shoe to draw inwards, imparting tension to a strand of the chain, and movement in an opposite direction is limited by interaction of the ratchet teeth and the pawl.

2. The tensioning system of claim 1, wherein the ratchet teeth are located on an opposite outside portion of the chain as the tensioner arm.

3. The tensioning system of claim 1, wherein the second end of the pivot arm is outside the loop of the chain.

4. The tensioning system of claim 3, wherein the biasing element is an extension spring.

5. The tensioning system of claim 1, wherein the interaction of the pawl and the ratchet teeth provide backlash.

* * * * *

UNITED STATES PATENT AND TRADEMARK OFFICE
CERTIFICATE OF CORRECTION

PATENT NO. : 6,849,015 B2
DATED : February 1, 2005
INVENTOR(S) : Markley et al.

It is certified that error appears in the above-identified patent and that said Letters Patent is hereby corrected as shown below:

Title page,
Item [73], Assignee, should read -- BorgWarner Inc., Auburn Hills, MI (US) --

Signed and Sealed this

Tenth Day of May, 2005

JON W. DUDAS
*Director of the United States Patent and Trademark Office*